(12) United States Patent
Kitami et al.

(10) Patent No.: US 9,656,921 B2
(45) Date of Patent: May 23, 2017

(54) FRICTION MATERIAL COMPOSITION AND FRICTION MATERIAL

(71) Applicant: AKEBONO BRAKE INDUSTRY CO., LTD., Tokyo (JP)

(72) Inventors: Takuya Kitami, Tokyo (JP); Katsuji Seki, Tokyo (JP); Yoshiyuki Sugai, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/034,623

(22) PCT Filed: Nov. 11, 2014

(86) PCT No.: PCT/JP2014/079811
§ 371 (c)(1),
(2) Date: May 5, 2016

(87) PCT Pub. No.: WO2015/072441
PCT Pub. Date: May 21, 2015

(65) Prior Publication Data
US 2016/0289126 A1  Oct. 6, 2016

(30) Foreign Application Priority Data
Nov. 12, 2013 (JP) .................... 2013-234269

(51) Int. Cl.
*C04B 35/80* (2006.01)
*F16D 69/02* (2006.01)

(52) U.S. Cl.
CPC ............ *C04B 35/80* (2013.01); *F16D 69/023* (2013.01); *F16D 69/026* (2013.01); *C04B 2235/3472* (2013.01); *C04B 2235/425* (2013.01); *C04B 2235/48* (2013.01); *C04B 2235/5216* (2013.01); *F16D 2200/0052* (2013.01); *F16D 2200/0065* (2013.01); *F16D 2200/0069* (2013.01); *F16D 2200/0073* (2013.01); *F16D 2200/0086* (2013.01)

(58) Field of Classification Search
CPC ............ C04B 35/80; C04B 2235/3472; C04B 2235/425; C04B 2235/48; C04B 2235/5216; F16D 69/023; F16D 69/026; F16D 2200/0052; F16D 2200/0065; F16D 2200/0069; F16D 2200/0073; F16D 2200/0086
See application file for complete search history.

(56) References Cited

U.S. PATENT DOCUMENTS

| | | |
|---|---|---|
| 5,266,395 A | 11/1993 | Yamashita et al. |
| 7,740,698 B2 | 6/2010 | Kitami et al. |
| 8,057,591 B2 | 11/2011 | Yaguchi et al. |
| 9,470,283 B2 | 10/2016 | Unno et al. |
| 2007/0287768 A1 | 12/2007 | Miyaji et al. |
| 2008/0156226 A1 | 7/2008 | Kitami et al. |
| 2009/0239076 A1 | 9/2009 | Yaguchi et al. |
| 2014/0202505 A1 | 7/2014 | Cotton et al. |
| 2016/0265612 A1 | 9/2016 | Unno et al. |

FOREIGN PATENT DOCUMENTS

| | | |
|---|---|---|
| CN | 101086285 A | 12/2007 |
| JP | H03-181628 A | 8/1991 |
| JP | H03-282028 A | 12/1991 |
| JP | H09-71768 A | 3/1997 |
| JP | 2005-097374 A | 4/2005 |
| JP | 2007-326999 A | 12/2007 |
| JP | 2008-179806 A | 8/2008 |
| JP | 2009-227768 A | 10/2009 |
| JP | 2011-219658 A | 11/2011 |
| JP | 2012-255051 A | 12/2012 |

OTHER PUBLICATIONS

Notification of First Office Action issued Dec. 27, 2016 in Chinese Patent Application No. 201480061766.9 (7 pages) with an English Translation (13 pages).

*Primary Examiner* — Anthony J Green
(74) *Attorney, Agent, or Firm* — Drinker Biddle & Reath LLP

(57) ABSTRACT

A friction material composition including a fiber base material, a friction modifier and a binder. A content of copper in the friction material composition is 0.5% by mass or less. The friction material composition includes a partially graphitized coke and muscovite. A friction material is formed by molding the friction material composition.

7 Claims, No Drawings

FRICTION MATERIAL COMPOSITION AND FRICTION MATERIAL

TECHNICAL FIELD

The present invention relates to a friction material composition and a friction material. More specifically, the present invention relates to a friction material composition excellent in wear resistance, noise resistance, brake effect, etc. and used for industrial machines, railroad vehicles, cargo vehicles, passenger cars, etc., and a friction material obtained from the friction material composition.

BACKGROUND ART

Conventionally, a friction material such as brake is produced by using a fiber base material, a friction modifier and a binder, blending them, and performing a production process including steps such as preforming, thermoforming and finishing. In the friction material such as brake, a fiber base material, e.g., an organic fiber such as aramid fiber, an inorganic fiber such as glass fiber, or a metal fiber such as copper fiber, an organic friction modifier such as rubber dust and cashew dust, an inorganic friction modifier such as calcium carbonate, barium sulfate, metal particle, ceramic particle and graphite, and a binder such as phenol resin, are used. Among them, graphite as a friction modifier when used as an ingredient of a friction material, not only ensures a stable friction coefficient in various environments due to its lubricity and in particular its excellent thermal stability and chemical stability but also exhibits excellent performance in terms of wear resistance and seizure resistance and enables reduction of various noises. Therefore, various kinds of graphite are blended in a friction material.

For example, Patent Document 1 describes a technique of blending, as a filler in a friction material, graphite having high elasticity such that the percentage of volume compression when applying a load of 9,000 kg/cm$^2$ is 80% or more based on application of a load of 0.1 kg/cm$^2$ and the percentage of recovery after removing the load is 50% or more.

Patent Document 2 describes a non-asbestos friction material using a fiber base material, a friction modifier and a binder, in which from 0.5% by volume to 2.5% by volume of a partially graphitized coke is blended.

Patent Document 3 describes a friction material containing an inorganic abrasive and a lubricant, in which an inorganic particle having a Mohs hardness of 5 to 8 (e.g., zirconium oxide) and an average particle diameter of 0.5 μm to 10 μm is contained as the inorganic abrasive in an amount of 0.5% by volume to 10% by volume based on the whole amount of the friction material, graphite and petroleum coke are contained as part of the lubricant in an amount of 8% by volume to 15% by volume in total based on the whole amount of the friction material, and the ratio of graphite and petroleum coke is from 2:8 to 3:7 by volume.

In the case of a non-asbestos friction material, a metal having large thermal conductivity, in particular a copper fiber or a copper particle, is sometimes added in order to enhance the fading resistance.

A fading phenomenon is caused by a decomposition gas generated resulting from decomposition of an organic substance contained in the friction material upon exposure of the friction material to high temperature and high load, and when copper having large thermal conductivity is added to the friction material, the heat radiation property of the friction material itself is increased, so that the generation of decomposition gas can be suppressed.

However, from concerns about environmental pollution such as river or sea pollution and adverse effects on the human body depending on the kind of metals, a friction material containing no heavy metal such as copper has been developed, and a move toward removing a heavy metal is recently accelerated on an international basis.

Patent Document 4 describes a non-asbestos friction material containing neither copper nor a copper alloy as a blending material for the raw material of the friction material and containing graphite and coke in an amount of 5% by volume to 25% by volume in total, in which the volume ratio of graphite/coke is from 2:1 to 7:1 and the average particle diameter of the coke is from 150 μm to 400 μm.

PRIOR ART DOCUMENTS

Patent Documents

Patent Document 1: JP-A-H03-282028
Patent Document 2: JP-A-2007-326999
Patent Document 3: JP-A-2009-227768
Patent Document 4: JP-A-2008-179806

SUMMARY OF THE INVENTION

Problems that the Invention is to Solve

However, when copper is removed, the noise resistance, effectiveness or heat radiation property of brakes is sometimes reduced, leading to a limitation in the kind of vehicle to which the friction material is applied.

Accordingly, with respect to a friction material composition containing neither copper nor a copper-containing metal and a friction material formed by molding the friction material composition, an object in the present invention is to provide a friction material using a specific high-elasticity graphite and a copper substitute material, where the defect of a copper-free friction material is complemented without almost deteriorating other properties and not only the wear resistance during high-temperature braking is enhanced but also the noise resistance and brake effect for fitting to a wide range of vehicle types are improved.

The "copper-free" as used in the present invention means that a copper component is not substantially contained in the friction material and specifically indicates that the content is 0.5% by mass or less based on the whole amount of the friction material composition.

Means for Solving the Problems

As a result of intensive studies to attain the above-described object, the present inventors have found that assuming that the whole amount of a brake friction material composition containing at least a fiber base material, a friction modifier and a binder is 100% by mass, when a partially graphitized coke and muscovite are contained each in a predetermined amount, even if the copper content is 0.5% by mass or less, the wear resistance of the obtained friction material during high-temperature braking can be enhanced and both of ensuring a high and stable friction coefficient and providing noise resistance can be achieved. The present invention has been accomplished based on this finding.

That is, the present invention could be achieved by the following (1) to (4).

(1) A friction material composition comprising a fiber base material, a friction modifier and a binder, wherein a content of copper in the friction material composition is 0.5% by mass or less and the friction material composition comprises a partially graphitized coke and muscovite.

(2) The friction material composition according to (1), wherein a content of the partially graphitized coke is from 2% by mass to 8% by mass based on a whole amount of the friction material composition.

(3) The friction material composition according to (1) or (2), wherein a content of the muscovite is from 1% by mass to 6% by mass based on a whole amount of the friction material composition.

(4) A friction material formed by molding the friction material composition as described in any one of (1) to (3).

Advantageous Effects of the Invention

In the present invention, muscovite and a partially graphitized coke (elastic coke) are used in combination, whereby without using copper, the wear amount during high-temperature (300° C. to 400° C.) sliding can be maintained at the same level as that of the conventional friction material using copper and the noise resistance and brake effect can be improved.

MODE FOR CARRYING OUT THE INVENTION

The mode for carrying out the present invention is described in detail below, but the following embodiment is only illustrative, and the present invention is not limited thereto.

In the description of the present invention, the "mass" means "weight".

The friction material composition in the present invention contains a fiber base material, a friction modifier and a binder, in which the content of copper in the friction material composition is 0.5% by mass or less and the friction material composition contains a partially graphitized coke and muscovite.

The "partially graphitized coke having elasticity" as used in the present invention is a graphitized coke obtained by stopping graphitization halfway during graphitizing raw material cokes to be graphitized so as to obtain an elastic graphite, and the graphitization ratio thereof is preferably from 80% to 95%. Examples of the raw material cokes include those conventionally used as a raw material for the production of an elastic graphite, such as carbonaceous mesophase or raw coke produced when heat-treating coal tar pitch, coal-based pitch, petroleum-based pitch, etc. at approximately from 350° C. to 500° C., or the carbonaceous mesophase or raw coke which are treated with nitric acid or a mixed acid of nitric acid and sulfuric acid.

In the partially graphitized coke (elastic coke) for use in the friction material in the present invention, the percentage of compression under a load of 900 MPa is preferably less than 80%, more preferably 60% or less. When the percentage of compression under a load of 900 MPa is less than 80%, an elastic effect on the friction material can be advantageously obtained. In addition, the percentage of recovery of the partially graphitized coke after removing the load is preferably more than 70%, more preferably 95% or more. By using a graphitized coke in which the percentage of recovery after removing the load exceeds 70%, a friction material having excellent noise resistance can be obtained.

The graphitization ratio of the partially graphitized coke (elastic coke) for use in the present invention, as measured by X-ray diffraction, is from 80% to 95%. The partially graphitized coke is sufficiently effective even with a small addition amount and may be contained in an amount of 2% by mass to 8% by mass, preferably from 3% by mass to 7% by mass, based on the whole amount of the friction material composition. In the friction material, the partially graphitized coke may be used in combination with conventional graphite (natural graphite or artificial graphite).

Here, the percentage of compression and percentage of recovery of the partially graphitized coke for use in the present invention are measured by the following method. Namely, about 10 g of a graphite sample is put in a stainless steel-made cylindrical mold having an inner diameter of 10 mm, and the surrounding is tapped to attain closest packing. A pushrod is inserted from the top, and a load of 10 Pa is applied. The height of the sample at this time is measured, and the value obtained is designated as $h_0$. Subsequently, a predetermined load is applied, and the value obtained by measuring the height of the sample is designated as $h_1$. Thereafter, the load is removed, and the value obtained by measuring the height of the sample here is designated as $h_2$. From these values, the percentage of compression and the percentage of recovery can be determined according to the following formulae (1) and (2):

$$\text{Percentage of compression (\%)} = (h_1/h_0) \times 100 \qquad (1)$$

$$\text{Percentage of recovery (\%)} = ((h_2-h_1)/h_0) \times 100 \qquad (2)$$

In the case of using the above-described partially graphitized coke, the average particle diameter thereof is preferably on the order of 0.1 mm to 1.0 mm. When the average particle diameter of the partially graphitized coke is within this range, the porosity in the friction material can be effectively increased while advantageously improving the elastic modulus of the friction material. As a result, in addition to good damping property, a decomposition gas generated from an organic substance during fading can escape into a pore in the partially graphitized coke, and the fading performance is improved. If the average particle diameter of the partially graphitized coke is less than 0.1 mm, the damping property may not be maintained in some cases. On the other hand, if the average particle diameter of the partially graphitized coke exceeds 1.0 mm, segregation may readily occur, and the dispersibility may be impaired. If the partially graphitized coke is not uniformly dispersed in the friction material, a metal catch that is a phenomenon that a metal attaches to the friction material sliding surface between the friction material and a counterpart material such as disc rotor is likely to occur.

The partially graphitized coke is blended as a friction modifier in the present invention, and the amount thereof is preferably from 2% by mass to 8% by mass, more preferably from 3% by mass to 7% by mass, based on the whole amount of the friction material composition. If the content of the partially graphitized coke is less than 2% by mass, the friction material lacks the damping property, and squeal or noise is readily produced (anti-squeal performance is deteriorated) in some cases. On the other hand, if the content of the partially graphitized coke exceeds 8% by mass, although the elastic modulus or lubricity is fairly increased, the content of other materials decreases and therefore, the friction coefficient or various performances such as strength may be reduced.

The muscovite (white mica, composition formula: $K_2O \cdot 3Al_2O_3 \cdot 6SiO_2 \cdot 2H_2O$) for use in the present invention is hard mica and has characteristic values of a Mohs hardness of 2.8 to 3.2, a tensile strength of 290 MPa to 440 MPa, a compressive strength of 490 MPa to 690 MPa, and an elastic modulus of $14×10^4$ MPa to $21×10^4$ MPa. Among them, those having little impurities such as MgO and $Fe_2O_3$ are suitable. Muscovite has a property of being vulnerable to flaking in the interlayer structure and therefore, when a stress acts in the layer direction of muscovite, a shear stress is generated in a resin layer existing among muscovite particles. As a result, the loss elastic modulus of the friction material using the composition in the present invention is increased, and an adhesive frictional force is produced.

On the other hand, mica (natural mica or synthetic mica) other than muscovite may be added as long as the object in the present invention can be achieved.

Muscovite having an average particle diameter of 5 µm or more is preferably used, and the average particle diameter is more preferably from 5 µm to 100 µm, still more preferably from 5 µm to 50 µm. If the average particle diameter is less than 5 µm, a sufficient adhesive frictional force may not be obtained.

The aspect ratio of muscovite is preferably from 10 to 150, more preferably from 20 to 130. If the aspect ratio is less than 10, a sufficient adhesive frictional force tends not to be obtained. If the aspect ratio exceeds 150, the strength of muscovite decreases, and the muscovite is readily split.

The muscovite for use in the present invention is particularly preferably a powder having an average particle diameter of 10 µm to 30 µm and an aspect ratio of 20 to 40.

Muscovite is preferably contained in an amount of 1% by mass to 6% by mass, more preferably from 1% by mass to 5% by mass, based on the whole amount of the friction material composition. When the content of the muscovite is within the range above, the wear resistance during high-temperature braking is enhanced, and both of assuring a high and stable friction coefficient and providing noise resistance can be advantageously achieved.

As described above, the friction material in the present invention uses a partially graphitized coke and muscovite in combination, and as for the contents of both ingredients, it is preferable to add the partially graphitized coke in an amount of 2% by mass to 8% by mass and the muscovite in an amount of 1% by mass to 6% by mass, based on the whole amount of the friction material composition.

Furthermore, the friction modifier preferably contains from 0.5% by mass to 3% by mass of a zinc powder having a particle diameter of 2 µm to 20 µm. The zinc powder needs to be uniformly dispersed in the friction modifier.

If the particle diameter of the zinc powder exceeds 20 µm, the number of particles appearing on the sliding surface of the friction material is reduced due to the excessively large particle diameter and therefore, the rust-preventing power decreases. On the other hand, if the particle diameter of the zinc powder is less than 2 µm, the zinc powder is likely to drop off from the braking surface due to the excessively small particle diameter to lessen its amount, and as a result, the rust-preventing power decreases.

In addition, if the content of the zinc powder is less than 0.5% by mass, the rust-preventing power becomes insufficient, and if it exceeds 3% by mass, reduction in the friction coefficient due to melting of zinc at a high speed and high temperature is increased.

In the blending of the friction material, usually employed materials are used as long as the gist of the present invention is observed, and examples thereof include a fiber base material, a binder, and other friction modifiers.

The fiber base material is used for reinforcing the friction material and as the fiber base material, examples thereof include a heat-resistant organic fiber, an inorganic fiber, and a metal fiber. Examples of the heat-resistant organic fiber include an aromatic polyamide fiber (aramid fiber) and a flame-resistant acrylic fiber; examples of the inorganic fiber include a potassium titanate fiber, a ceramic fiber (a bio-soluble ceramic fiber is preferably used), a glass fiber, a carbon fiber, a rock wool and the like; and examples of the metal fiber include a steel fiber. These may be used individually or in combination of two or more kinds thereof. In order to ensure sufficient mechanical strength, the content of the fiber base material is preferably from 1% by mass to 10% by mass, more preferably from 2% by mass to 8% by mass, based on the whole amount of the friction material composition.

The binder is composed of a thermosetting resin, and examples of the thermosetting resin include a phenol resin, an epoxy resin, a resin obtained by modifying such a thermosetting resin with cashew oil, silicone oil, various elastomers, etc., and a resin obtained by dispersing, in the thermosetting resin above, various elastomers, a fluoropolymer, etc. These may be used individually or in combination of two or more kinds thereof. In order to ensure sufficient mechanical strength and wear resistance, the content of the binder is preferably from 7% by mass to 12% by mass, more preferably from 8% by mass to 11% by mass, based on the whole amount of the friction material composition.

Examples of other friction modifiers include an organic filler such as cashew dust, rubber dust (pulverized powder of tire tread rubber), various unvulcanized rubber particles and various vulcanized rubber particles, an inorganic filler such as barium sulfate, calcium carbonate, calcium hydroxide, vermiculite, mica, plate-like potassium titanate, scale-like lithium potassium titanate or magnesium potassium titanate, and amorphous potassium titanate, an abrasive such as silicon carbide, alumina, magnesia, chromite, triiron tetroxide, zirconium oxide and zirconium silicate, a lubricant such as molybdenum disulfide, tin sulfide, zinc sulfide and iron sulfide, and a non-ferrous metal particle other than copper and a copper alloy, such as tin powder. These may be used individually or in combination of two or more kinds thereof. The content of the friction modifier is, according to desired frictional properties, preferably from 60% by mass to 90% by mass, more preferably from 65% by mass to 85% by mass, based on the whole amount of the friction material composition.

In addition, other blending materials may be used, if desired.

The production of a friction material may be performed by a conventional production steps and, for example, the friction material can be produced through steps of mixing of blending materials, preforming, thermoforming, heating, grinding, etc. A brake pad having the above-described friction material can be produced through the following steps (1) to (4):

(1) a step of forming a steel sheet (pressure plate) into a predetermined shape by sheet-metal press;

(2) a step of subjecting the steel plate formed into a predetermined shape to a degreasing treatment, a chemical conversion treatment and a primer treatment;

(3) a step of thermoforming the pressure plate after steps (1) and (2) and the preformed body of the friction material above at predetermined temperature and pressure in a thermoforming step, thereby integrally fixing both members; and (4) a step of performing after-curing, and finally performing finishing treatments such as grinding, scorching and coating.

EXAMPLES

The present invention is described more specifically below by referring to Examples, but the scope of the present invention is not limited only to these Examples.

Examples 1 to 7 and Comparative Examples 1 to 4

Preparation of Friction Material

The blending materials shown in Tables 1 and 2 were collectively put in a mixer, followed by mixing. Thereafter, each of the obtained mixtures was processed through steps of preforming (1), thermoforming (2), heating and grinding (3), etc., thereby preparing a friction material (brake pad).
(1) Preforming The mixture above was put in the mold for preforming press, followed by forming at room temperature under 20 MPa for 10 seconds, thereby preparing a preformed article.
(2) Thermoforming This preformed article was put in a thermoforming mold, and a metal plate (pressure plate: P/P) previously coated with an adhesive was laminated thereon, followed by thermocompression-forming at 150° C. under 45 MPa for 5 minutes.
(3) After this thermocompression-formed body was heat-treated at 250° C. for 3 hours, grinding was performed so as to have a predetermined thickness of 17.0 mm, and coating was performed, thereby obtaining a friction material (brake pad).

<Friction Material Evaluation Test>

Using the prepared frictions materials of Examples 1 to 7 and Comparative Examples 1 to 4, evaluation of rotor attack, measurement of compression deformation amount (compression strain), evaluation of pedal feeling, friction performance (effect performance) test, wear performance test, and squeal test were performed. The results obtained are also shown in Tables 1 and 2. In the following, the base material indicates the conventional friction material containing copper (Comparative Example 2).
(1) Evaluation of Rotor Attack The brake pad was processed into a test piece of 20 mm×30 mm and pressed against a rotor at 60 km/h and a pressure of 0.02 MPa for 40 hours and thereafter, the wear amount of the rotor was checked and evaluated according to the following evaluation criteria:

[Evaluation Criteria]
  A: Base material+less than 5%
  B: Base material+5% or more and less than 10%
  C: Base material+10% or more
(2) Measurement of Compression Deformation Amount (Compression Strain)

In conformity with JIS D4413, the compression deformation amount (compression strain) (mm) when applying a load of 2 MPa, 4 MPa, 6 MPa, 8 MPa and 10 MPa was measured, respectively.
(3) Evaluation of Pedal Feeling By using the measurement result of compression strain in the evaluation of 4 MPa in the measurement of compression deformation amount (compression strain) above, the pedal feeling was evaluated according to the following evaluation criteria:

[Evaluation Criteria]
  A: The variation from base material is within ±30%.
  B: The variation from base material is more than ±30% and less than ±35%.
  C: The variation from base material is ±35% or more.
(4) Friction Performance Test (Effect Test)

The test was performed in conformity with JASO C406, and the performance was evaluated according to the following evaluation criteria:

[Evaluation Criteria]
  A: 0.40±0.03
  B: More than 0.34 and less than 0.37
  C: 0.34 or less
(5) Friction Performance Test The test was performed in conformity with JASO C427, and the performance was evaluated according to the following evaluation criteria:

[Evaluation Criteria]
  A: Base material+less than 5%
  B: Base material+5% or more and less than 10%
  C: Base material+10% or more
(6) Squeal Test The number of occurrences of squeal noise of 70 dB or more during 1,000 braking events at 100° C. in the wear test was counted and evaluated according to the following evaluation criteria:

[Evaluation Criteria]
  A: 70 dB or more, less than 5%
  B: 70 dB or more, 5% or more and less than 15%
  C: 70 dB or more, 15% or more

TABLE 1

|  |  | (Content: % by mass) |  |  |  |  |  |  |
|---|---|---|---|---|---|---|---|---|
|  |  | Example | | | | | | |
|  |  | 1 | 2 | 3 | 4 | 5 | 6 | 7 |
| Blending composition | Phenol resin | 10 | 10 | 10 | 10 | 10 | 10 | 10 |
|  | Rubber dust | 4 | 4 | 4 | 4 | 4 | 4 | 4 |
|  | Cashew dust | 4 | 4 | 4 | 4 | 4 | 4 | 4 |
|  | Barium sulfate | 14 | 16 | 12 | 11 | 14 | 11.5 | 10.5 |
|  | Calcium carbonate | 2 | 2 | 2 | 2 | 2 | 2 | 2 |
|  | Calcium hydroxide | 3 | 3 | 3 | 3 | 3 | 3 | 3 |
|  | Potassium titanate | 17 | 17 | 17 | 17 | 17 | 17 | 17 |
|  | Tin sulfide | 3 | 3 | 3 | 3 | 3 | 3 | 3 |
| Mica | Phlogopite | 0 | 0 | 0 | 0 | 0 | 0 | 0 |
|  | Muscovite | 3 | 1 | 5 | 6 | 3 | 3 | 3 |
|  | Zirconium silicate | 6 | 6 | 6 | 6 | 6 | 6 | 6 |
|  | Iron oxide | 12 | 12 | 12 | 12 | 12 | 12 | 12 |
|  | Aramid pulp | 4 | 4 | 4 | 4 | 4 | 4 | 4 |
|  | Graphite | 10 | 10 | 10 | 10 | 10 | 10 | 10 |

TABLE 1-continued (Content: % by mass)

| | | | Example | | | | | | |
|---|---|---|---|---|---|---|---|---|---|
| | | | 1 | 2 | 3 | 4 | 5 | 6 | 7 |
| | Petroleum coke | | 0.5 | 0.5 | 0.5 | 0.5 | 3 | 0.5 | 0.5 |
| | Elastic coke | | 4.5 | 4.5 | 4.5 | 4.5 | 2 | 7 | 8 |
| | Biosoluble ceramic fiber | | 2 | 2 | 2 | 2 | 2 | 2 | 2 |
| | Zinc | | 1 | 1 | 1 | 1 | 1 | 1 | 1 |
| | Electrolytic copper powder | | 0 | 0 | 0 | 0 | 0 | 0 | 0 |
| | Total | | 100 | 100 | 100 | 100 | 100 | 100 | 100 |
| Physical properties | Compression strain (mm) | 2 MPa | 0.030 | 0.030 | 0.030 | 0.030 | 0.023 | 0.030 | 0.037 |
| | | 4 MPa | 0.070 | 0.070 | 0.070 | 0.070 | 0.07 | 0.080 | 0.088 |
| | | 6 MPa | 0.100 | 0.100 | 0.100 | 0.100 | 0.09 | 0.120 | 0.130 |
| | | 8 MPa | 0.130 | 0.130 | 0.130 | 0.130 | 0.12 | 0.150 | 0.160 |
| | | 10 MPa | 0.150 | 0.150 | 0.150 | 0.150 | 0.14 | 0.170 | 0.187 |
| Friction properties | Pedal feeling | | A | A | A | A | A | A | A |
| | Rotor attack | | A | A | A | B | A | A | A |
| | Squeal | | A | A | A | B | A | A | A |
| | Effect (μ) | 50 km/h | A | A | A | A | A | A | A |
| | | 100 km/h | A | A | A | A | A | A | A |
| | | 130 km/h | A | B | A | A | A | A | B |
| | Wear | 100° C. | A | A | A | A | A | A | A |
| | | 200° C. | A | A | A | A | A | A | A |
| | | 300° C. | A | A | A | A | A | A | A |
| | | 400° C. | A | A | A | A | A | A | A |

TABLE 2

(Content: % by mass)

| | | | Comparative Example | | | |
|---|---|---|---|---|---|---|
| | | | 1 | 2 | 3 | 4 |
| Blending composition | Phenol resin | | 10 | 10 | 10 | 10 |
| | Rubber dust | | 4 | 4 | 4 | 4 |
| | Cashew dust | | 4 | 4 | 4 | 4 |
| | Barium sulfate | | 14 | 9 | 17 | 14 |
| | Calcium carbonate | | 2 | 2 | 2 | 2 |
| | Calcium hydroxide | | 3 | 3 | 3 | 3 |
| | Potassium titanate | | 17 | 17 | 17 | 17 |
| | Tin sulfide | | 3 | 3 | 3 | 3 |
| | Mica | Phlogopite | 3 | 3 | 0 | 0 |
| | | Muscovite | 0 | 0 | 0 | 3 |
| | Zirconium silicate | | 6 | 6 | 6 | 6 |
| | Iron oxide | | 12 | 12 | 12 | 12 |
| | Aramid pulp | | 4 | 4 | 4 | 4 |
| | Graphite | | 10 | 10 | 10 | 10 |
| | Petroleum coke | | 5 | 5 | 0.5 | 5 |
| | Elastic coke | | 0 | 0 | 4.5 | 0 |
| | Biosoluble ceramic fiber | | 2 | 2 | 2 | 2 |
| | Zinc | | 1 | 1 | 1 | 1 |
| | Electrolytic copper powder | | 0 | 5 | 0 | 0 |
| | Total | | 100 | 100 | 100 | 100 |
| Physical properties | Compression strain (mm) | 2 MPa | 0.020 | 0.030 | 0.030 | 0.020 |
| | | 4 MPa | 0.060 | 0.070 | 0.070 | 0.060 |
| | | 6 MPa | 0.080 | 0.100 | 0.100 | 0.080 |
| | | 8 MPa | 0.100 | 0.130 | 0.130 | 0.110 |
| | | 10 MPa | 0.120 | 0.150 | 0.150 | 0.130 |
| Friction properties | Pedal feeling | | A | A | A | A |
| | Rotor attack | | A | A | A | A |
| | Squeal | | C | A | A | C |
| | Effect (μ) | 50 km/h | A | A | A | A |
| | | 100 km/h | B | A | B | A |
| | | 130 km/h | C | A | C | B |
| | Wear | 100° C. | A | A | A | A |
| | | 200° C. | A | A | A | A |
| | | 300° C. | B | A | A | A |
| | | 400° C. | C | A | A | A |

In Table 1, in Examples 1 to 7 using partially graphitized coke (elastic coke) and muscovite as the blending material in a copper-free friction material, Examples 1 to 4 are the case where the blending amount of muscovite in the friction material was changed, and Examples 5 to 7 are the case where the amount of partially graphitized coke added was changed.

It has been found from the results in Tables 1 and 2 that based on the friction material having added thereto copper, the friction material of Examples 1 to 7 where both of muscovite and partially graphitized coke were added can achieve performances comparable to those of the friction material containing 5% by mass of copper (Comparative Example 2). However, the friction material where at least one of muscovite and graphitized coke was not added (Comparative Examples 1, 3 and 4) cannot satisfy the evaluation items of squeal, effect and wear.

While the present invention has been described in detail and with reference to specific embodiments thereof, it will be apparent to one skilled in the art that various changes and modifications can be made therein without departing from the spirit and scope of the present invention. This application is based on Japanese Patent Application No. 2013-234269 filed on Nov. 12, 2013, the contents of which are incorporated herein by way of reference.

INDUSTRIAL APPLICABILITY

The friction material in the present invention, in which both of partially graphitized coke and muscovite, i.e., hard mica, are blended each in an appropriate amount as part of the friction modifier in the raw material of the friction material, can ensure wear resistance at high temperature as a copper-free friction material and adjust the balance with noise resistance while keeping a high friction coefficient (effect) and therefore, the friction material is expected to have a demand in particular as an industrial machine or a friction material fitting to a wide range of vehicle types such as railroad vehicle, cargo vehicle and passenger car, more specifically, as an ecologically-minded product for a brake pad, a brake lining or a clutch facing to be used in the applications above.

The invention claimed is:

1. A friction material composition comprising a fiber base material, a friction modifier and a binder, wherein a content of copper in the friction material composition is 0.5% by mass or less and the friction material composition comprises a partially graphitized coke and muscovite, wherein the content of the partially graphitized coke is from 3% by mass to 8% by mass based on the whole amount of the friction material composition and a content of the muscovite is from 1% by mass to 6% by mass based on the whole amount of the friction material composition.

2. The friction material composition according to claim 1, wherein the binder is from 7% by mass to 12% by mass of a whole amount of the friction material composition.

3. The friction material composition according to claim 1, wherein an average particle diameter of the partially graphitized coke is from 0.1 mm to 1.0 mm.

4. The friction material composition according to claim 1, wherein an average particle diameter of the muscovite is from 5 μm to 50 μm.

5. The friction material composition according to claim 1, wherein the friction modifier comprises 0.5% by mass to 3% by mass of zinc powder.

6. The friction material composition according to claim 5, wherein the zinc powder has an average particle diameter of 2 μm to 20 μm.

7. A friction material formed by molding the friction material composition as described in claim 1.

* * * * *